March 11, 1952

J. G. HORN 2,588,839

PNEUMATIC CONTROL APPARATUS

Filed Nov. 14, 1947

INVENTOR.
JOSEPH G. HORN
BY Arthur H. Swanson
ATTORNEY

Patented Mar. 11, 1952

2,588,839

UNITED STATES PATENT OFFICE 2,588,839

PNEUMATIC CONTROL APPARATUS

Joseph G. Horn, Drexel Hill, Pa., assignor, by mesne assignments, to Minneapolis-Honeywell Regulator Company, Minneapolis, Minn., a corporation of Delaware Application November 14, 1947, Serial No. 785,904

7 Claims. (Cl. 137—153)

The general object of the present invention is to provide an improved air controller for use in effecting control of the type commonly known as two position control with an adjustable differential gap, or inactive neutral. That type of control is well known and is characterized by the fact that the ultimate control element is a regulator having only two normal positions, namely, an open or maximum effect position, and a closed or minimum effect position, and that the value of the controlled variable at which the regulator is adjusted from its minimum position to its maximum position differs by an adjustable amount from the value of the variable at which the regulator is adjusted from its maximum position to its minimum position. Thus, for example, in a typical use of control apparatus of the above mentioned type to regulate the supply of fuel to a liquid heater, the control apparatus may be arranged to open the fuel valve when the temperature of the liquid in the heater tank falls to 115° F., and to close the fuel valve when the temperature of the water in the heater tank rises to 125°.

While there is now, and long has been a substantial need for and considerable use of apparatus for effecting two position control with differential gap, most of the apparatus for such use is not of the pneumatic controller type. While air controllers for effecting such control have been proposed from time to time, they have been generally open to objection because their operation was not entirely satisfactory, or because they were undesirably complicated and expensive to construct. I have found, however, that an effective and a relatively simple and inexpensive air controller providing two position air control with an adjustable differential gap, can be produced by mechanically and pneumatically coupling two expansible air chambers and an associated air controller valve mechanism in accordance with the principles of the present invention.

In the preferred form of the invention, the first and second expansible air chambers are mechanically connected so that the expansion of each opposes the expansion of the other, and said second chamber is in restricted communication with the atmosphere, and the pressure in said first chamber is controlled by valve means automatically adjusted in accordance with variations in the control variable and in accordance with the expansion and contraction of said chamber, and the two chambers are connected by a pressure equalizing conduit including an adjustable flow restricting device.

The pressure in the first chamber thus controls the pressure in the second chamber, and the means for automatically controlling the air valve means are so arranged that when the controlled variable attains a predetermined value corresponding to either limit of the differential gap, the pressure in the first chamber is immediately increased from its minimum value, or is reduced from its maximum value to its minimum value depending on whether the value of the control variable is then at one limit or the other of the differential gap. The regulable flow restricting device in the conduit connection between the two chambers ordinarily comprises a throttle valve adjustable to vary the pressure equalizing flow of air between the two chambers.

The effect of an increase or decrease in the restricting effect of the flow restricting device is to increase or decrease the throttling range of the controller, i. e., to increase or decrease the expansion and contraction of the first chamber resulting from the sudden increase or decrease in the pressure in that chamber. The magnitude of the differential gap is proportional to the controller throttling range, and is thus subject to precise regulation by the adjustment of said throttling device. The range of variation of the differential gap corresponds in practice to a throttling range variation of from 1% to 100%.

A distinctive characteristic of the invention is the arrangement of the air valve means, so that an initial change in the pressure in the first chamber results in a positive follow-up or feedback adjustment of the valve means rapidly augmenting said initial pressure change until the first chamber pressure attains its maximum or minimum value, depending on the direction of the initial change.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of the invention.

Figures 1, 2:
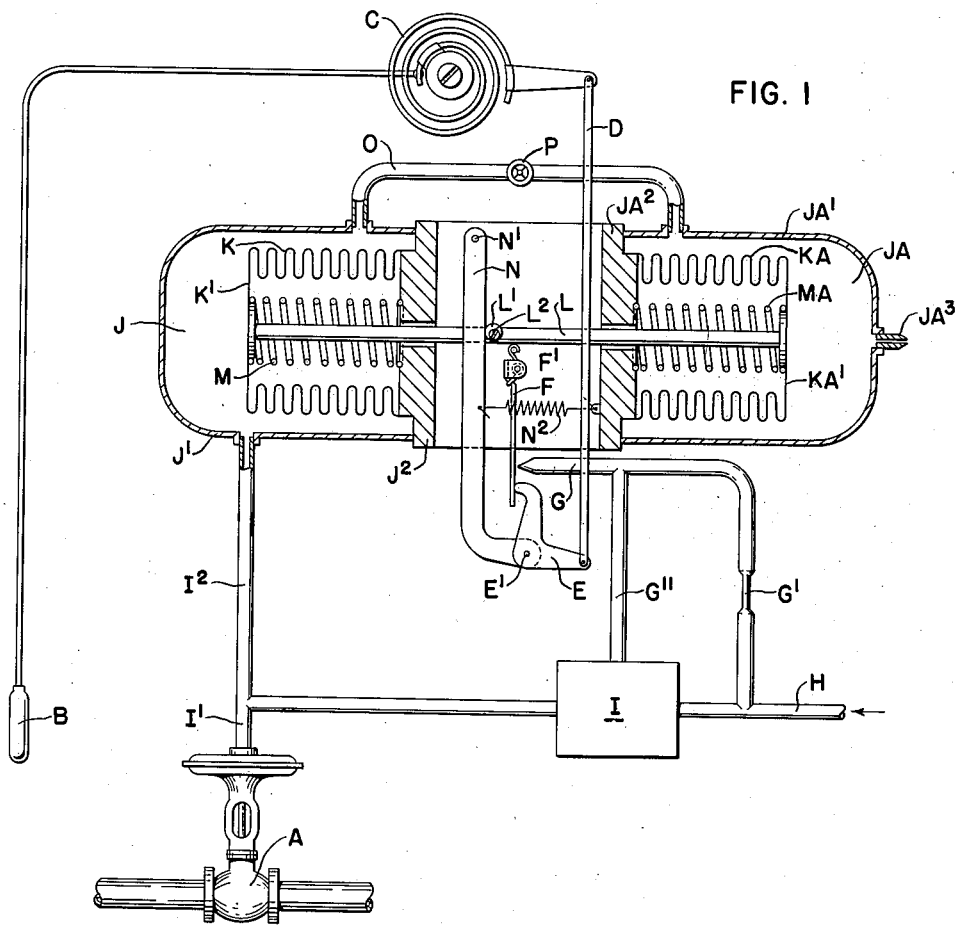
Fig. 1 is a diagrammatic representation of the improved air controller.
Fig. 2 is a diagram illustrating the operation of the controller.

In the embodiment of the present invention shown diagrammatically by way of example in Fig. 1, the final control element is a regulator valve A, which may be a fuel supply valve, a reservoir charging valve, or other final control element having a wide open or maximum effect position, and a fully closed or minimum effect position. As shown, the regulator valve A is opened as the temperature of the bulb B of a fluid pressure thermometer decreases to a predetermined value, and closes when the temperature rises to a second predetermined value higher than the first mentioned value. As diagrammatically shown, the thermometer bulb pressure transmitted to a Bourdon tube C of spiral form and having one end fixed, and having its other end movable, to move a link D up or down as the thermometer temperature increases and decreases, respectively.

As shown, up and down movements of the link D give counter-clockwise and clockwise adjustments, respectively, to a valve actuating bell-crank lever E about the fulcrum pivot E' on which the lever is mounted. A counter-clockwise adjustment of the lever E moves a flapper valve F away from the discharge orifice of a bleed nozzle G, and the clockwise adjustment of the lever E permits the valve F to move towards the nozzle G. The valve F is pivoted at F' and biased for movement toward the nozzle G. The nozzle G receives air under pressure through a restricted passage G' from a supply pipe H. The latter is adapted to supply air at a predetermined pressure, which normally is of the order of 17 pounds per inch. The pressure in the nozzle G varies from a maximum which is but little below the pressure in the pipe H, when the valve F substantially covers or closes the discharge orifice at the end of the nozzle G, and a minimum which is but little above the pressure of the atmosphere when the valve F is displaced from the nozzle for its operating range which may well be of the order of .004 of an inch. The nozzle pressure is transmitted by the pipe connection G'' to the control inlet of a pilot valve or pneumatic relay I of conventional type. The pilot valve I is connected to the air supply pipe H, and operates automatically to maintain a relay output pressure in predetermined proportion to the nozzle pressure transmitted to the relay I through the pipe connection G''. The relay output pressure is transmitted by a pipe I' to the pressure chamber of the fluid pressure regulator or valve A.

The pilot valve output pressure is also transmitted by the pipe $I^2$ to the pressure chamber J of the air controller. The wall of the chamber J comprises a rigid cup-shaped casing section J', a rigid plate-like supporting member $J^2$ extending across and to which the open end of the casing J' is connected, and a movable wall portion within the space surrounded by the casing J' and comprising a tubular corrugated bellows body K connected at one end to the support $J^2$, and having its other end connected to and closed by a movable end wall K'. The latter is connected by a cross-bar or connecting rod L to the portion KA' of the enclosing wall of a pressure chamber JA. The wall structure of the chamber JA, comprises elements JA', $JA^2$, KA and KA' corresponding respectively, to the parts J', $J^2$, K and K' of the chamber J wall structure. The chamber JA differs from the chamber J in that it is in restricted communication with the atmosphere through a vent passage $JA^3$. The structure enclosing the chamber JA is turned end for end relative to the chamber J structure, so that the plate-like supporting members $J^2$ and $JA^2$ are juxtaposed. Each of those parts is formed with an opening for the passage of the rod L and to place the space within the corresponding bellows element K or KA in free communication with the atmosphere.

The movable bellows end walls K' and KA' and the rod L are biased to normal positions. The biasing force may be due, in part, to the natural resiliency of the corrugated bellows bodies K and KA which are ordinarily formed of spring metal, but is due largely to bias springs M and MA. The bias spring M is a helical compression spring acting between the movable end wall part K' and the stationary supporting part $J^2$. The spring MA is like the spring M and acts between the bellows end wall part KA' and the supporting member $JA^2$.

The longitudinal movements of the rod L effect adjustments of the flapper valve F through a lever N engaged by a lateral projection L' from the rod L. The projection L' is shown as a cam or excentric which may be secured to the rod L in different adjustments by a clamping screw $L^2$ to thereby vary the position of the lever N for calibrating purposes. The lever N is suspended from a stationary pivot N', and at its lower end carries the pivot E' on which the lever E is journalled. The body portion of the lever N is at the left side of the pin L' and is held in engagement with the latter by a bias spring $N^2$.

In consequence, when the chamber J expands and the bar L moves to the right, the lever N turns in the counter-clockwise direction about its supporting pivot N' and moves the bell crank lever E to the right, and thus permits the flapper valve F to move toward the discharge end of the orifice G under the action of the bias spring F'. The regulator valve A is biased to its closed position and closes when the output pressure of the pilot valve I is at a minimum so that the bellows elements K and KA and rod L may be moved to their normal positions by the bias forces acting on them. The chambers J and JA are connected by a pressure equalizing conduit O, including an adjustable flow restricting device P which may be a needle valve or analogous element permitting of a restricted regulable flow of air between the chambers J and JA. As is hereinafter explained, the extent of the differential gap obtainable with the controller shown in Fig. 1, depends on the extent to which the flow through the conduit O is restricted.

The operating cycle of the apparatus shown in Fig. 1 is illustrated in Fig. 2, wherein distances measured along the horizontal line OX represent the thermometer bulb temperatures, and distances measured along the vertical line OY represent the extent to which the valve A is displaced from its wide open position. Thus, the point 1 of Fig. 2 represents an operating condition in which the temperature of the bulb B is at its minimum value assumed to be 115° F., which corresponds to the low limit of the differential gap. During the stage of the operating cycle represented by the horizontal line connecting the points 1 and 2, the valve A is wide open and the temperature of the bulb B progressively increases from its minimum value to its maximum value assumed to be 125° F. The increase of the bulb temperature to the value represented by the point 2, results in an adjustment of the valve actuating lever E by the Bourdon tube C which initiates a rapid closure of the valve A. The closing adjustment of the valve A occurs during the stage of the operating cycle represented by the vertical line connecting the points 2 and 3, and is effected so rapidly that there is no significant difference in bulb temperatures between the points 2 and 3. With the valve A closed, the temperature gradually diminishes from its high value to low value during the stage of the operating cycle represented by the horizontal line connecting the points 3 and 4. The reduction of the bulb temperature to its low value indicated by the point 4, results in an opening adjustment of the regulator valve A. That adjustment is rapidly effected during the stage of the operating cycle represented by the vertical line connecting the points 4 and 1.

The condition of the control apparatus shown in Fig. 1 is that existing at the beginning of the cycle stage represented by the line connecting the points 3 and 4 during which the thermometer falls from its maximum to its minimum value. The pressure in the chamber J is then at its minimum value, normally that of the atmosphere, and the valve A is fully closed as a result of its own bias action, and in consequence of its high internal fluid pressure. In Fig. 1, the Bourdon spiral C then holds the link D in or near its elevated position. With the link D thus elevated, the lever E holds the flapper valve F too far away from the nozzle G to have any significant throttling effect on the air being discharged by the nozzle G. In consequence, the nozzle pressure and the pressure in the chamber J are then approximately equal to the pressure of the atmosphere.

As the temperature decreases from its value represented by the point 3 to the value represented by the point 4, the pressure in the Bourdon spiral tube C diminishes and the link D is lowered. This permits the flapper valve to approach the nozzle G. When the thermometer bulb temperature drops to the value represented by the point 4, the flapper valve F is close enough to the nozzle G to initiate an increase in the nozzle pressure to effect a resultant increase in the pressure in the chamber J. The expansion of the chamber J produced by an initial increase in the pressure in the chamber results in a movement of the rod L to the right, a counter-clockwise adjustment of the lever N, and a bodily adjustment of the lever E to the right which permits of a further movement of the flapper E toward the nozzle G. The initial expansion of the chamber J thus initiates a positive feed-back adjustment of the flapper valve, and results in a rapid completion of the full expansion of the chamber J permitted by the form and adjustment of the apparatus. During an intermediate portion of the expansion of the chamber J, the flapper valve is brought into engagement with the nozzle G, and its movement in the counterclockwise direction ends. The movement of the lever E to the right continues however, throughout the final portion of the expansion of the chamber J. At the end of the expansion, the valve operating lever E is in a position in which its upper end is separated from the flapper valve F by an appreciable gap. The increase in the pressure in the chamber J just described results in the adjustment of the valve A into its wide open position.

The only significant change in the condition of the apparatus which occurs during the stage in the cycle of operation represented by the line connecting the points 1 and 2, is the gradual upward movement of the link D resulting from the increase in the thermometer bulb temperature and in the Bourdon tube pressure. That upward movement of the link D gradually turns the lever E counter-clockwise and when the temperature represented by the point 2 is attained, the lever E has been given sufficient counter-clockwise movement to move the flapper valve F out of engagement with the nozzle G and thus initiates a reduction in the nozzle pressure and in the pressure in the chamber J. The initial reduction in the chamber J pressure results in an initial contraction of the chamber and thereby effects a movement of the rod L to the left, a clockwise adjustment of the lever N, and a bodily movement of the lever E to the left, and a further movement of the flapper F away from the nozzle G. The contraction of the chamber J initiated on the attainment of the thermometer bulb temperature indicated by the point 2 thus results in a positive feed-back adjustment of the flapper valve which continues rapidly until the maximum contraction of the chamber J is effected and the regulator A is adjusted into its closed position indicated by the point 3, and the controller apparatus is returned to the condition illustrated in Fig. 1.

A full understanding of the effect of the adjustment on the throttling valve P on the throttling range of the controller and on the extent of the differential gap represented by the horizontal distance first between the lines 4—1 and 2—3, may be facilitated by taking into account the conditions prevailing when the valve P is fully closed, and when the valve is wide open. When the valve P is fully closed and the pressure in the chamber J is steady at either its maximum or minimum value, the pressure in the chamber JA quickly becomes equal to the pressure of the atmosphere as a result of the flow through the bleed orifice JA³. In this condition of the apparatus, on a change in the pressure in the chamber J from its minimum to its maximum value, the expansion of the chamber is limited only by the bias spring action opposing the expansion. That action is due mainly to the compression of the spring M, but is ordinarily supplemented by the opposition of the resilient bellows elements K and KA to force variations in their lengths. Similarly, when the valve P is closed, the reduction of the pressure in the chamber J from its maximum to its minimum values, results in a rapid contraction of the chamber which is completed when the bias force acting on the bellows element K and KA move their end walls K' and KA' and the rod L into their normal positions. With the valve P closed, the throttling range of the controller is at the maximum which the controller design makes possible. In consequence, the regulator valve A is then opened, and closed only when the thermometer bulb temperature attains the respective minimum and maximum values to which the apparatus is operatively responsive.

With the valve P adjusted to its wide open position, the pressures in the chambers J and JA will be substantially equalized at all times. When the flapper F is thus adjusted to build up the pressure in the chamber J to its maximum value, the pilot valve supplies air to the chamber J and to the pipe O at a rate in excess of the rate of outflow of air from the chamber JA through the bleed port with the pressure then existing in the chamber JA. That pressure under such condition is approximately equal to the pressure then existing in the chamber J. Under this condition, changes in the pressure in the chamber J produce no significant contraction and expansion of the chamber J, and consequently no significant adjustment of the rod L and lever N. The total throttling range will then be of the order of 1% with a corresponding minimum differential gap which exists in the operation of an ordinary on and off controller having no provisions for obtaining a differential gap.

When the valve P occupies a position intermediate its wide open and fully closed position, the pressure in the chamber JA during periods in which the pressure in the chamber J is at a maximum, exceeds the pressure of the atmosphere, but is less than the pressure in the chamber J by an amount corresponding to the pressure drop in the valve P. Under such condition, the throttling range of the controller, and hence, the differential gap of the control action corresponds to the difference between the pressures in the chambers J and JA when the pressure in the chamber J is at a maximum. Thus, the simple control mechanism shown provides two position control with a differential gap which can be widely and accurately regulated by adjustment of a throttle valve or other adjustable flow restricting device through which the chambers J and JA are in communication.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention what I claim as new and desire to secure by Letters Patent, is:

1. An air controller for effecting two position control with an adjustable differential gap, comprising in combination first and second expansible air chambers each having a movable wall biased to a normal position and mechanically connected to the other so that an expansion or contraction of the first chamber is attended by the contraction or expansion, respectively, of the second chamber, a pressure equalizing conduit connection between said chambers including an adjustable flow restricting device, said second chamber having a vent passage through which that chamber is in restricted communication with the atmosphere, valve means adjustable to increase and decrease the air pressure in said first chamber, operating mechanism for said valve means including means responsive to variations in the value of a controlled variable and including means responsive to the expansion and contraction of said first chamber, said first and second operating means cooperating to effect an initial adjustment of said valve means to vary the air pressure in said first chamber in one direction or the other when the value of said variable attains one or the other of two different predetermined values, and to effect a further adjustment in the same direction of said valve means on the expansion or contraction of said first chamber resulting from said initial adjustment.

2. An air controller as specified in claim 1, in which said valve means is adapted to effect full regulation of said first chamber pressure on an adjustment of said valve means through a predetermined range, and in which the valve operating means responsive to the expansion and contraction of said first chamber is adapted to adjust said valve means through a range of adjustments of greater extent than the first mentioned range.

3. An air controller as specified in claim 1, in which said valve means is biased for adjustment in the direction to increase the first chamber pressure to a maximum, is adapted to vary said first chamber pressure between minimum and maximum values on an adjustment of said valve means through a predetermined range, and in which the operating means responsive to the expansion and contraction of said first chamber adjusts the valve means to a greater extent in one direction than is required to reduce said pressure to its minimum value and moves farther in the opposite direction than is required to permit the valve means to increase said pressure to a maximum.

4. An air controller for effecting two position control with an adjustable differential gap, comprising in combination first and second expansible chambers each having a movable wall biased to a normal position and mechanically connected to the other so that an expansion or contraction of the first chamber is attended by the contraction or expansion, respectively, of the second chamber, a pressure equalizing conduit connection between said chambers including an adjustable flow restricting device, said second chamber having a vent passage through which that chamber is in restricted communication with the atmosphere, valve means comprising a bleed nozzle in restricted communication with a source of air under pressure and having a bleed orifice and comprising a valve movable relative to said nozzle toward and away from said orifice to thereby regulate the air pressure in said nozzle, means for maintaining a pressure in said first chamber varying with said nozzle pressure, and valve operating means including means responsive to variations in a controlled variable for adjusting said valve means to vary the nozzle pressure in a direction depending on the direction of change of said variable, and including means responsive to the expansion and contraction of said first chamber and actuated by an initial expansion or contraction of the latter for adjusting said valve means to augment the nozzle pressure variation which produced said initial expansion or contraction.

5. An air controller as specified in claim 4, in which said valve is biased for movement into a position in which it engages said nozzle and closes said orifice and is adapted to effect full regulation of the nozzle pressure on a movement of said valve through a predetermined range of movement and away from the nozzle, and in which the valve operating means responsive to the expansion and contraction of said first chamber is adapted to move said valve through a range of movement toward and away from said orifice of greater extent than the first mentioned range of movement.

6. An air controller as specified in claim 4, in which said valve is biased for movement into a position in which it engages said nozzle and closes said orifice and is adapted to effect full regulation of the nozzle pressure on a movement of said valve through a predetermined range of movement toward and away from the nozzle, and in which the valve operating means responsive to the expansion and contraction of said first chamber moves the valve farther away from the nozzle than is required to reduce the nozzle pressure to a minimum and moves farther in the opposite direction than is required to permit the valve to engage said nozzle.

7. An air controller as specified in claim 4, in which said valve is biased for movement into the position in which it engages said nozzle and closes said orifice, and in which the valve operating means includes a movable lever support and a lever pivoted on said support, and in which the valve operating means responsive to variations in the controlled variable is adapted to angularly adjust said lever relative to said support in the direction to engage said valve and move it away from said nozzle, or in the direction to permit the valve to engage said nozzle, depending on the direction of variable variation, and in which the valve operating means responsive to the expansion and contraction of said first chamber moves said support in the direction to move said lever farther away from said valve than is required to effect the maximum reduction in the nozzle pressure and moves said support in the opposite direction farther than is required to permit said valve to engage said nozzle.

JOSEPH G. HORN.

REFERENCES CITED

The following references are of record in the file of this patent:

UNITED STATES PATENTS

| Number | Name | Date |
|---|---|---|
| 1,680,750 | Smoot | Aug. 14, 1928 |
| 2,386,108 | Gess | Oct. 2, 1945 |